US012608523B1

(12) United States Patent
Lau Neto et al.

(10) Patent No.: US 12,608,523 B1
(45) Date of Patent: Apr. 21, 2026

(54) APPLICATION-SPECIFIC INTEGRATED CIRCUIT (ASIC) SYNTHESIS BASED ON LOOKUP TABLE (LUT) MAPPING AND OPTIMIZATION

(71) Applicant: Synopsys, Inc., Mountain View, CA (US)

(72) Inventors: Walter Lau Neto, Salt Lake City, UT (US); Luca Gaetano Amaru, Santa Clara, CA (US); Vinicius Neves Possani, Sunnyvale, CA (US); Patrick Vuillod, St. Bernard du Touve (FR); Jiong Luo, Morgan Hill, CA (US)

(73) Assignee: Synopsys, Inc., Sunnyvale, CA (US)

( * ) Notice: Subject to any disclaimer, the term of this patent is extended or adjusted under 35 U.S.C. 154(b) by 743 days.

(21) Appl. No.: 17/991,780

(22) Filed: Nov. 21, 2022

Related U.S. Application Data

(60) Provisional application No. 63/281,814, filed on Nov. 22, 2021.

(51) Int. Cl.
| | |
|---|---|
| *G06F 30/30* | (2020.01) |
| *G06F 30/327* | (2020.01) |
| *G06F 30/337* | (2020.01) |
| *G06F 30/343* | (2020.01) |
| *G06F 115/06* | (2020.01) |

(52) U.S. Cl.
CPC .......... *G06F 30/327* (2020.01); *G06F 30/337* (2020.01); *G06F 30/343* (2020.01); *G06F 2115/06* (2020.01)

(58) Field of Classification Search
None
See application file for complete search history.

(56) References Cited

U.S. PATENT DOCUMENTS

| | | | | |
|---|---|---|---|---|
| 7,814,452 B1* | 10/2010 | Jang | ......................... | G06F 30/34 |
| | | | | 716/103 |
| 11,669,665 B1* | 6/2023 | Amaru | .................. | G06F 30/343 |
| | | | | 716/104 |
| 2023/0028953 A1* | 1/2023 | King | .................. | G06F 12/0802 |

OTHER PUBLICATIONS

E. J. Mccluskey, Jr., "Minimization of Boolean Functions," The Bell System Technical Journal, Nov. 1956, pp. 1417-1444, (Year: 1956).*
R.K. Brayton et al., "Multilevel Logic Synthesis," Proc. of the IEEE, vol. 78, No. 2, Feb. 1990, pp. 264-300. (Year: 1990).*

(Continued)

*Primary Examiner* — Leigh M Garbowski
(74) *Attorney, Agent, or Firm* — Fenwick & West LLP

(57) ABSTRACT

Some aspects utilize an iterative process to synthesis a logic network within an ASIC using lookup table (LUT) optimization techniques. The logic network may be represented by an And-Inverter graph (AIG), as described in more detail below. On each iteration, the current AIG representation of the logic network is mapped to a network of k-LUTs. A k-LUT is a lookup table that can represent any function of k variables. This network may then be improved using LUT optimization techniques. The improved network of k-LUTs is decomposed into a trial AIG representation, which may be further improved for example by applying Boolean-based optimization techniques. The current AIG representation may then be updated in accordance with the quality of the trial AIG representation produced by the current iteration. The final AIG representation from the iterations is synthesized to a netlist of standard cells.

20 Claims, 6 Drawing Sheets

(56)     References Cited

OTHER PUBLICATIONS

E. M. Sentovich et al., "SIS: A System for Sequential Circuit Synthesis," May 4, 1992, pp. 1-45. (Year: 1992).*

S. Muroga, "Logic Synthesizers, The Transduction Method and its Extension, SYLON," Springer Science+Business Media New York 1993, T. Sasao (ed.), Chapter 3: Logic Synthesis and Optimization, pp. 59-86. (Year: 1993).*

A. Mishcenko et al., "FRAIGS: A Unifying Representation for Logic Synthesis and Verification," ERL Technical Report, 2005, 7 pages. (Year: 2005).*

A. Mishcenko et al., "Combinational and Sequential Mapping with Priority Cuts," 2007 IEEE, pp. 354-361. (Year: 2007).*

R. Brayton et al., "ABC: An Academic Industrial-Strength Verification Tool," Springer-Verlag Berlin Heidelberg 2010, T. Touili, B. Cook, and p. Jackson (EDS.), pp. 24-40. (Year: 2010).*

"ABC: A System for Sequential Synthesis and Verification," Berkeley Verification and Synthesis Research Center, last updated Sep. 20, 2012, 16 pages. (Year: 2012).*

Amaru, L. et al. "Improvements to Boolean Resynthesis," Design, Automation & Test in Europe Conference & Exhibition, Mar. 19, 2018, pp. 755-760.

Amaru, L. et al. "LUT-Based Optimization for ASIC Design Flow," 58th ACM/IEEE Design Automation Conference, Dec. 5, 2021, pp. 871-876.

Brglez, F. et al. "Automated Synthesis for Testability," Transactions on Industrial Electronics, vol. 36, No. 2, May 1989, pp. 263-277.

Chang, S.C. et al. "Circuit Optimization by Rewiring," Transactions on computers, vol. 48, No. 9, Sep. 1999, pp. 962-970.

Cong, J. et al. "FlowMap: An Optimal Technology Mapping Algorithm for Delay Optimization in Lookup-Table Based FPGA Designs," IEEE Transactions on Computer Aided Design of Integrated Circuits and Systems, vol. 13, No. 1, Jan. 1994, pp. 1-12.

Francis, R. et al. "Chortle-crf: Fast Technology Mapping for Lookup Table-Based FPGAs," Design Automation Conference, Jun. 1, 1991, pp. 227-233.

Liu, G. et al. "PIMap: A Flexible Framework for Improving LUT-Based Technology Mapping via Parallelized Iterative Optimization," ACM Transactions on Reconfigurable Technology and Systems, vol. 11, No. 4, Jan. 9, 2019, pp. 1-23.

Machado, L. et al. "Support-Reducing Decomposition for FPGA Mapping," Transactions on Computer-Aided Design of Integrated Circuits and Systems, vol. 39, No. 1, Oct. 25, 2018, pp. 213-224.

Manohararajah, V. et al. "Heuristics for Area Minimization in LUT-Based FPGA Technology Mapping," Transactions on Computer-Aided Design of Integrated Circuits and Systems, vol. 25, No. 11, Oct. 23, 2006, pp. 2331-2340.

Mischenko, A. et al. "Improvements to Technology Mapping for LUT-Based FPGAS," Transactions on Computer-Aided Design of Integrated Circuits and Systems, vol. 26, No. 2, Feb. 22, 2006, pp. 240-253.

Mischenko, A. et al. "Scalable Don't Care-Based Logic Optimization and Resynthesis," ACM Transactions on Reconfigurable Technology and Systems, vol. 4, No. 4, Dec. 28, 2011, pp. 1-23.

Mishchenko, A. et al. "Boolean Factoring and Decomposition of Logic Networks," Conference on Computer-Aided Design, Nov. 10, 2008, pp. 38-44.

Modi, N. et al. "Boolean Decomposition Using Two-Literal Divisors," 17th International Conference on VLSI Design, Jan. 9, 2004, pp. 765-768.

Riener, H. et al. "Scalable Generic Logic Synthesis: One Approach to Rule Them All," 56th ACM/IEEE Design Automation Conference, Jun. 2, 2019, pp. 1-6.

Testa, E. et al. "Scalable Boolean Methods in a Modern Synthesis Flow," Design, Automation, & Test in Europe Conference & Exhibition, Mar. 25, 2019, pp. 1643-1648.

* cited by examiner

600

APPLICATION-SPECIFIC INTEGRATED CIRCUIT (ASIC) SYNTHESIS BASED ON LOOKUP TABLE (LUT) MAPPING AND OPTIMIZATION

RELATED APPLICATION

This application claims priority under 35 U.S.C. § 119(e) to U.S. Provisional Patent Application Ser. No. 63/281,814, "Application-Specific Integrated Circuit (ASIC) Synthesis Based on Lookup Table (LUT) Mapping And Optimization," filed Nov. 22, 2021. The subject matter of all of the foregoing is incorporated herein by reference in their entirety.

TECHNICAL FIELD

The present disclosure relates to synthesis of application-specific integrated circuits (ASICs) using lookup table (LUT) optimization techniques.

BACKGROUND

During ASIC synthesis, a logical description of an integrated circuit, such as hardware description language (HDL) code, is transformed into a netlist of standard cells and gates. In some embodiments, the netlist may be a graph structure where nodes of the graph structure represent components of a circuit and edges of the graph structure represent interconnections between the components. Both the HDL code and the netlist can be used by an electronic design automation (EDA) product to verify that the integrated circuit, when manufactured, performs according to the specified design. The netlist can be optimized for a target semiconductor manufacturing technology. A common goal of ASIC synthesis is to reduce the area occupied by the components in the netlist.

SUMMARY

In some aspects, an iterative process is used to synthesize a logic network within an ASIC using lookup table (LUT) optimization techniques. The logic network may be represented by an And-Inverter graph (AIG), as described in more detail below. On each iteration, the current AIG representation of the logic network is mapped to a network of k-LUTs (which includes LUTs of size k and smaller). A k-LUT is a lookup table that can represent any function of k variables. This network may then be improved using LUT optimization techniques. The improved network of k-LUTs is decomposed into a trial AIG representation, which may be further improved for example by applying Boolean-based optimization techniques. The current AIG representation may then be updated in accordance with the quality of the trial AIG representation produced by the current iteration. The final AIG representation from the iterations is synthesized to a netlist of standard cells.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
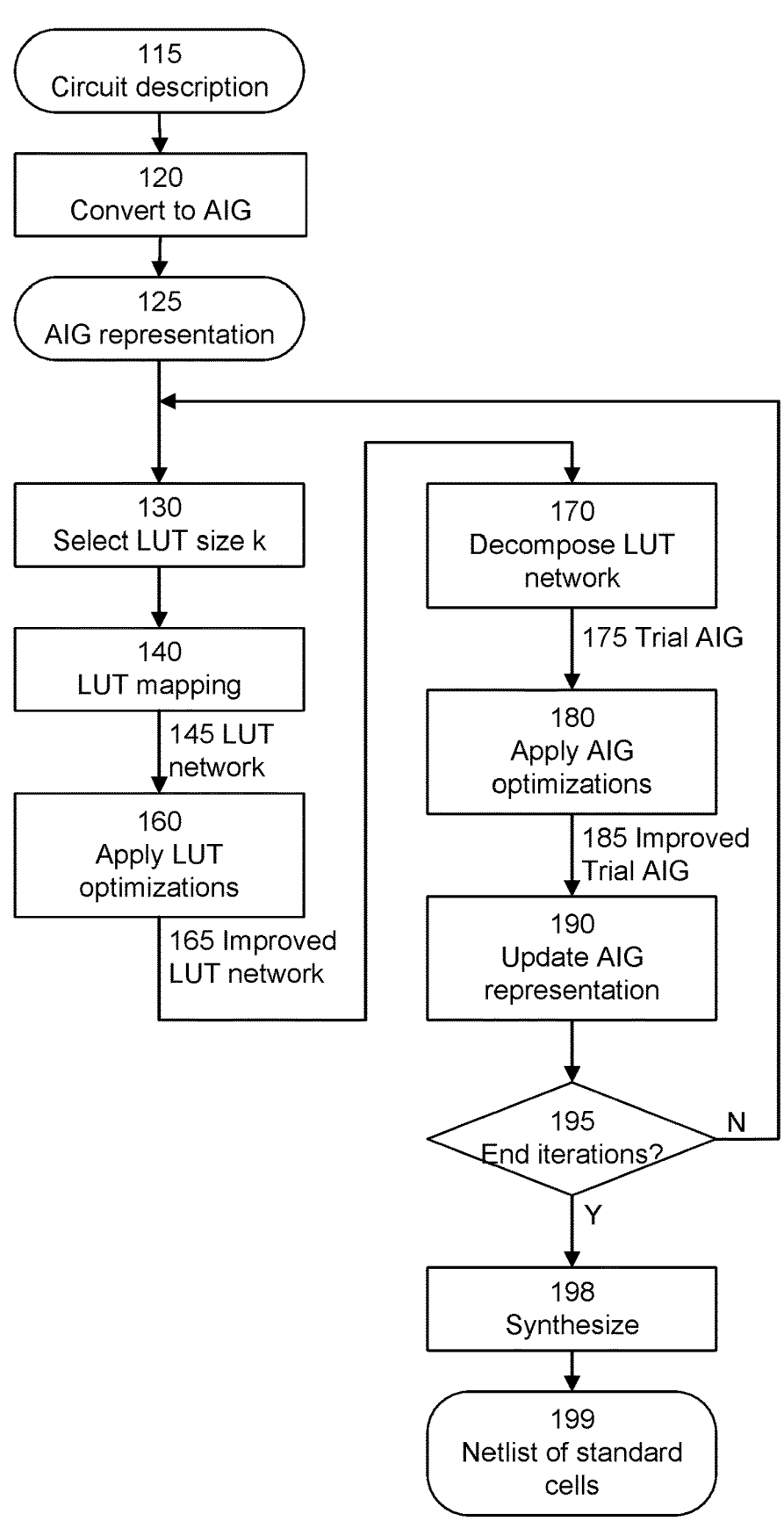
FIG. 1 is a flow diagram of ASIC synthesis based on iterative use of LUT optimization techniques according to embodiments of the present disclosure.

Aspects of the present disclosure relate to ASIC synthesis based on lookup table (LUT) mapping and optimization. In an ASIC synthesis operation, a functional level design of a logic network is transformed into a gate-level netlist of standard cells. In the present disclosure, ASIC synthesis is achieved by transforming the logic network into a network of interconnected lookup tables (LUTs) and then applying optimization techniques to improve the network of LUTs. This process is iterated for LUTs with different numbers of inputs. The final network of LUTs from these iterations is then reduced to the gate-level netlist of standard cells.

Implementing a logic network with a network of interconnected LUTs is an approach used to configure FPGAs (field programmable gate arrays), because LUTs are often the basic building block for FPGAs. A LUT is circuitry with a given number of inputs, where the circuitry can implement any logic that is a function of the inputs. A k-LUT is a LUT with k inputs. FPGAs are often constructed as a group of configurable and interconnectable LUTs. Therefore, if a logic network can be reduced to a set of interconnected LUTs, the logic network can then be configured on the FPGA. Each LUT on the FPGA is configured to implement the logic required to implement the overall logic network. However, the LUTs on the FPGA are fixed in area because they are already fabricated, so all k-LUTs occupy the same area on the FPGA regardless of what function is configured on the k-LUT.

A LUT-based approach traditionally has not produced good results for the synthesis of ASICs. In part, this is because standard cells (gates) rather than LUTs are the basic building block for ASICs. Two different logic functions that are both expressed as k-LUTs would occupy the same area on an FPGA because the LUTs on the FPGA are already fabricated and occupy the same area regardless of what logic function is implemented. However, the two logic functions could occupy very different areas on an ASIC because each k-LUT implementation on the ASIC need only implement the specific logic function of interest using standard cells. The ASIC need not implement the generalized k-LUT capable of implementing any logic function (whereas such LUTs are already fabricated on FPGAs). Thus, a netlist that is optimized to be implemented by LUTs may not be optimized to be implemented by standard cells. This can result in larger area and higher power consumption, compared to other synthesis approaches.

In the present disclosure, LUT optimization techniques are altered to be better targeted to ASICs. Some aspects utilize an iterative process to synthesize a logic network within an ASIC via LUTs. The logic network may be represented by an And-Inverter graph (AIG), as described in more detail below. On each iteration, the current AIG representation of the logic network is mapped to a network of k-LUTs (which may or may not include LUTs smaller than size k), where different iterations use different values of k. This network may then be improved using LUT optimization techniques. The improved network of k-LUTs is decomposed into a trial AIG representation, which may be further improved for example by applying Boolean-based optimization techniques. The current AIG representation may then be updated in accordance with the quality of the trial AIG representation produced by the current iteration. For example, if the trial AIG representation occupies less area, then it may become the new current AIG representation. After the iterations are completed, the final AIG representation is synthesized to a netlist of standard cells. For convenience, the approaches described herein using LUT optimization techniques will be referred to as LUT-engines.

In a LUT-based flow for ASICS LUT mapping is driven by estimated area (which is more relevant for ASICs) rather than LUT count (which is more relevant for FPGAs). Area may be estimated based on a count of literals in the logic function to be implemented by the LUT, or a count of nodes (2-input AND gates) in an AIG (And-Inverter Graph) representation of the logic function. AIGs are used to represent and optimize Boolean functions and circuits. They are directed acyclic graphs, where each internal node is a Boolean AND, and edges can be either regular or complemented (complemented edges are inversions). LUT mapping driven by AIG count operates as an eliminate, subject to an upper bound on the fan-in (number of inputs) of the LUTs. This type of logic representation and optimization can find Boolean simplifications which are difficult to find using other techniques. It can also enable stronger and more global Boolean optimization techniques, which are less likely to get stuck in local minima. This is further enhanced if used in a lossless synthesis fashion, meaning that intermediate mappings are recorded so that past iterations are not lost and may be retrieved if desirable. As a result, the use of LUT optimization techniques may be used to improve the area, power consumption or other Quality of Results (QoR) achievable by logic synthesis for ASICs.

Technical advantages of the present disclosure include, but are not limited to, the following. First, using different LUT sizes k for different iterations increases the solution space that is explored, leading to better synthesis results such as smaller area, higher performance and/or lower power consumption. The consideration of different LUT sizes k allows the LUT-engine to consider both functionality and structure. In this context, larger k values provide powerful Boolean optimization opportunities to reduce the complexity of the functions, whereas smaller k values unlock an iterative restructuring of the network.

The approach described herein is also capable of fast iterations. It can be driven by scalable mappers and optimizers as described below, but with the flexibility to operate on LUTs of different sizes. Further improvements are described to accommodate heterogeneous values of k. This includes improvements to the sequence of optimizations/mapping/network-transformations in order to improve the Quality of Results (QoR), to improve or guarantee convergence especially in presence of mixed-k, and to improve scalability. Various methods for selecting a schedule of LUT sizes k for the iterations are also described to improve the QoR.

Another improvement described herein is a scalable LUT mapper, with native support to balance LUT-count and NAND2-count costs. This supports iterations with large values of k while maintaining tight control on the NAND2 impact (i.e., impact on area), which is important for QoR convergence.

Another improvement is a specialized Boolean factoring method, which makes use of the known bounds on nodes' fanin in the LUT networks. This approach supports scalable and quick decomposition of LUTs into minimized AIGs, which in turn leads to fast iterations.

In more detail, FIG. 1 is a flow diagram of ASIC synthesis based on iterative use of LUT optimization techniques according to embodiments of the present disclosure. The description 115 of an ASIC includes a logic network that implements a functionality of the ASIC. The initial description 115 may be a higher-level functional description, such as a register transfer level description or a description in hardware description language (HDL) code.

Circuits can also be represented as a directed acyclic graph (DAG), denoted as G=(N, E), where each node n∈N either has no incoming (fanin) edges or has some incoming edges. Nodes with no fanin are the Primary inputs (PIs), and nodes with incoming edges implement a Boolean function. An outgoing edge of a node n is the node's fanout. Edges may or may not be inverted. A common type of DAG for logic manipulation is the And-Inverter Graph (AIG), in which every internal vertex represents a 2-input AND Boolean function. In the example of FIG. 1, the ASIC synthesis uses both AIG and LUT-based representations of the logic network being synthesized. At 120, the circuit description 115 is converted to an AIG representation 125 using standard techniques.

For the sake of brevity, this example uses AIG representations of the logic network. However, the techniques described apply equally to mapped networks and to primitive networks. Primitive networks are logic networks decomposed into a set of primitive functions, such as NAND, NOR, INV, MUX, XNOR, and any of these representations may be used instead of AIG representations.

The AIG representation 125 is improved using the iterative loop shown in FIG. 1 and in the pseudo-code of Code Listing 1 below. The following first provides an overview of Code Listing 1 and FIG. 1 and then provides additional details on the different instructions in Code Listing 1 and steps of FIG. 1.

---

Code Listing 1: LUT-engine flow

```
    Input: AIG 𝒩 , Effort level ℰ , Strategy S, Maximum k
           size m. Seed x, List of sizes l
    Output: Optimized AIG 𝒩 '
1       𝒩 ' ← duplicate( 𝒩 );
2       while ℰ > 0 do
3           k ← select_k(S, m, k, x, l);
4           compute_choices( 𝒩 ):
5           BoundedNtk ←new_specialized_mapper( 𝒩 , k);
6           boolean_optimization(BoundedNtk);
7           𝒩 ← boolean_decomposition(BoundedNtk);
8           aig_optimization( 𝒩 )
9           if num_nodes( 𝒩 ') > non_nodes( 𝒩 ) then
```

-continued

Code Listing 1: LUT-engine flow

```
10        _𝒩' ← duplicate(𝒩 );
11        update_effort(ℰ );
12        return 𝒩';
```

In Code Listing 1, the inputs are an AIG network $\mathcal{N}$, an effort level ε which determines how many iterations of instructions 2-11 are run, and a strategy $\mathcal{S}$ to choose the k values for each iteration. In instruction 1, the input AIG $\mathcal{N}$ is duplicated and stored as the $\mathcal{N}'$ variable, which holds the current best AIG.

In instruction 3 (step 130 of FIG. 1), the LUT size k is selected for the current iteration. Different strategies $\mathcal{S}$ can be employed to select k, as shown in Code Listing 2 below. In Code Listing 2, different strategies can be implemented, depending on the user input $\mathcal{S}$. The available strategies include increment k in steps of one (if $\mathcal{S}$ =0), deterministic randomization based on a user seed (if $\mathcal{S}$ =1), or iterate over a predefined list of k (if $\mathcal{S}$ =2). If none of these are selected, Code Listing 2 defaults to a strategy that uses a custom function that increases the LUT size k in different steps, and selects the LUT size k based on a deterministic random basis. Some strategies ensure that every iteration uses a different k value and/or that k is increasing (or not decreasing) in value with each iteration.

Code Listing 2: Selection of LUT size k

```
         Input: Strategy S, Maximum k size m, Seed x, List of
           size l
         Output: LUT size k
1        k ← 0;
2        if S == 0 then
3        ⌊ k ← increment_by_one(k, m);
4        else if S == 1 then
5        ⌊ k ← deterministic_randomization(k, m, s);
6        else if S == 2 then
7        ⌊ k ← iterate_over_list(k, l)
8        else
9        ⌊ k ← customized_value(k, m)
10       return k;
```

Instructions 4 and 5 of Code Listing 1 correspond to step 140 of FIG. 1, which is mapping the current AIG representation 125 to a network of k-LUTs 145. Instruction 4 computes a choice network, which reduces structural bias. This choice computation involves grouping nodes with the same functionality into equivalent classes for the purposes of mapping to k-LUTs. In this example, an SAT-based approach is used to compute the choice nodes. Thus, it is beneficial to have a smaller AIG 125 in order to reduce the overall runtime.

Once the choices nodes are computed, instruction 5 uses a specialized LUT technology mapping tailored to ASICs. Since instruction 5 is repeated for every iteration, it is beneficial to have an efficient mapper that delivers good quality mapping in a short runtime. This example uses a cut-based structural mapper that is described in more detail in FIG. 2 below.

After technology mapping, instruction 6 (step 160 in FIG. 1) applies a sequence of Boolean-based optimizations, resulting in a LUT network 165 with improved functionality. Several methods may be used, which are described in more detail in FIG. 3 below.

Instruction 7 (step 170 in FIG. 1) decomposes the LUT network 165 into an AIG, referred to as the trial AIG 175 in FIG. 1. This example uses a Boolean decomposition algorithm that considers the AIG implementation cost. It uses a specialized cost function. In some cases, truth table-based methods can be used without exploding the runtime. Further details about the Boolean decomposition algorithm are described in FIG. 4 below.

After decomposing the LUT network into an AIG, instruction 8 (step 180 in FIG. 1) applies various AIG optimizations to improve the trial AIG. These optimizations include four different passes in this example: (i) rewriting; (ii) refactoring; (iii) resubstitution; and (iv) balance. This reduces the circuit structure, reducing the circuit size and depth.

Finally, instructions 9-11 (step 190 of FIG. 1) compare to see if the trial network $\mathcal{N}$ is better than the current best network $\mathcal{N}'$ and update the AIG accordingly. In this example, quality is evaluated based on the equivalent NAND-2 cost, which is a measure of area. If the current iteration yields an improvement, then the trial AIG $\mathcal{N}$ is retained as the current best AIG $\mathcal{N}'$.

The loop iterates until an end point is reached (while loop of instruction 2, and step 195 of FIG. 1).

At 198 of FIG. 1, the final AIG representation produced by the iterations is synthesized to a gate-level netlist 199 of standard cells.

Mapping AIG to LUTs

Figure 2:
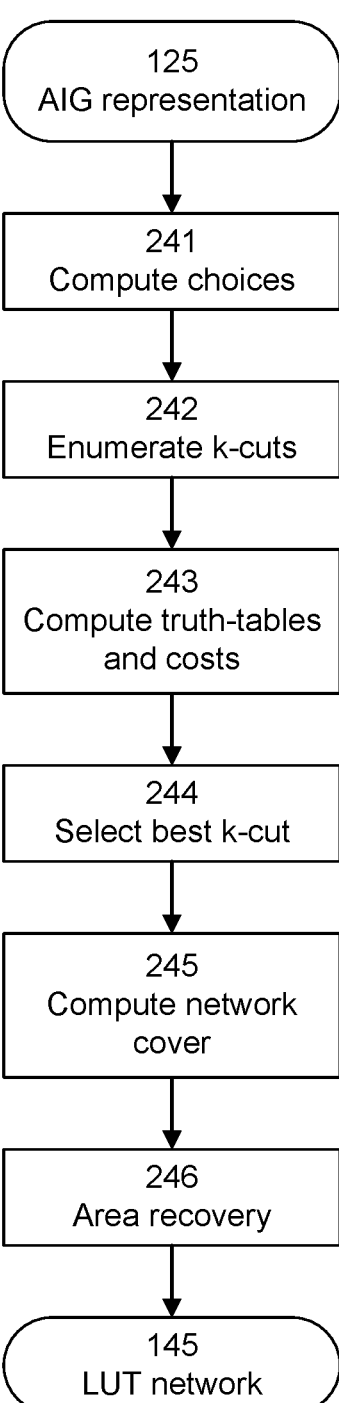
FIG. 2 is a flow diagram of mapping an AIG to a network of k-LUTs according to embodiments of the present disclosure.

In LUT mapping, a logic network is covered with (implemented by) a network of k-bounded lookup tables (k-LUTs) where each k-LUT has k inputs and can represent any function of k variables. FIG. 2 is a flow diagram of mapping an AIG to a network of k-LUTs according to embodiments of the present disclosure. The LUT mapping shown in FIG. 2 is an example implementation of the mapping step 140 of FIG. 1 (instruction 5 in Code Listing 1). This LUT mapper is designed for ASICs, rather than FPGAs. One advantage of this mapper is that it is fast and flexible for different values of k, while presenting good quality of results. In particular, the mapper converges to a good NAND-2 implementation cost for different values of k. This is beneficial so that the LUT-engine converges to a good AIG implementation even for a large range of LUT sizes k.

The flow begins with an AIG representation 125. In this representation, the logic network is represented by a graph where each node is a 2-input AND gate. The task of mapping the AIG representation 125 to a network of k-LUTs is to form groups of AND gates with k inputs per group. Each group of AND gates may then be implemented as a k-LUT.

At 241, the mapper computes choices (Instruction 4 of Code Listing 1).

At 242, possible k-cuts are enumerated for the network. As a pre-processing step, the mapper may sweep the network to clean up the network. Nodes that are single input gates (buffers and inverters) may be collapsed. In addition, propagation of constants may be used to simplify the network. Possible k-cuts are then identified.

In one approach, k-cuts for the network are enumerated by traversing the network recursively from Primary Outputs (POs) to Primary Inputs (PIs) computing the cut set (partitioning into k-LUTs) for each internal node. If a given network can be partitioned in different ways, the mapper can process them during the k-cut enumeration step to increase the mapping opportunities.

A cut c of a root node n is a pair (n, L), where L is the set of the cut's leaves, such that any path from a primary input to node n passes through at least one leaf. A trivial cut of n is composed of n itself. Non-trivial cuts cover all the nodes found on the paths from the root to the leaves, including the root and excluding the leaves. A cut is k-feasible if it has up to k leaves. Thus, starting from the PIs, and given an internal node n with fanins a, b∈N, the set of cuts for n, Φ(n), can be obtained through the set Union of the set of cuts for a and b as follows:

$$\Phi(n) = \{\{n\}\} \cup \{u \cup v | u \in \Phi(a), v \in \Phi(b), |u \cup v| \le k\} \qquad (1)$$

At 243, the truth table and cost for different k-cuts is computed. While computing the cuts (step 242), the mapper can also compute their function and the area cost and then cache this information. The function may be based on truth tables, as there is a tight boundary in the number of inputs, defined by the LUTs. The area cost may be given by a factored form of the function. In one approach, an algebraic method to this factorization is used as an area estimator. Once the mapper computes the cut's function and its area cost, this information can be cached. For every cut, the mapper stores: (i) the unique ID of the cut leaves; (ii) the cut truth table; and (iii) the cut area cost. The mapper caches this information in memory, so then reading the cut information is done in constant ($\mathcal{O}(1)$) time.

At 244, the best k-cut for each node is selected based on a specialized cost function. To define the best cut used during the network covering, this example mapper uses an adaptation of the area flow heuristic (AF). For a given LUT n, with m inputs (leaves), such that m≤k, the area flow heuristic can be computed as follows: 0 if n is a primary input, or as Area(n)+

$$\text{Area}(n) + \sum_{n=1}^{m} AF(l_1)\}/RefCount[n],$$

otherwise. Here $l_i$ defines the LUTs $i_{th}$ leaf. Informally, the reference counter (RefCount) of a given LUT can be interpreted as how many times such a LUT is used in the current mapping, i.e., how many other LUTs take such a LUT as input. In the case of some LUT mappers, such as those used for FPGAs, the area of n is considered to be unitary, i.e., all the k-LUTs have the same area. In the current case for ASICs, the area is given by the cached factored literal count (area estimate).

Typically, a LUT mapper for FPGAs does not consider the literal/AIG count of the internal logic of a given LUT. However, since this LUT mapper reshapes the network for ASIC synthesis, the internal LUT area is estimated to distinguish the cost of selecting a smaller or a larger cut during the mapping process. Therefore, this mapper computes possible matches of cuts into LUTs by considering the implicit literal/AIG count of k-cuts into LUTs.

At 245, the network cover is computed.

At 246, area recovery for the mapped network is performed. Once the logic network is covered, the mapper may perform rounds of area recovering based in the exact (local) area, and area flow. For some other mappers, the exact area of a given cut rooted at a node n is computed by summing the number of LUTs needed to implement the Maximum Fanout-Free Cone (MFFC) of n, as all the k-LUTs are assumed to have the same area cost. In the current case for ASICs, the area is computed by summing up the factored literal cost of the LUTs in the MFFC of n. The exact area gives a local view of how many literals could be saved by removing the LUT (cut) from the mapping. The mapper interleaves rounds of exact area mapping with global area (area flow) heuristic. The number of iterations of each can be controlled to trade-off runtime and quality of results.

The flow shown in FIG. 2 allows LUT mapping to run iteratively while keeping the runtime under control and converging to good NAND-2 equivalent implementations for different LUT granularities (different values of k). A runtime profile of the mapper of FIG. 2 shows it takes a small fraction of the overall flow runtime.

Other types of LUT mappers may be used. For example, tree mappers partition the initial graph into a forest of trees, map each tree individually and combine the mapping for each tree to find a cover (implementation) for the logic network. Alternate methods may instead collapse the network into nodes with more than k variables and decompose them to obtain a k-LUT mapping. Other approaches find a cover for the network from the set of possible partitions of the network into k-LUTs. The FlowMap algorithm is a known algorithm for LUT mapping, which obtains a minimum depth k-LUT cover for a network. That is, it produces an implementation using k-LUTs, where the implementation has the minimum number of LUTs from input to output (i.e., depth). In yet another approach, runtime may be improved by using only a subset of the possible partitions of the network into k-LUTs, known as priority cuts.

Other improvements include speed up of cut (partition) computation and area recovery. Several approaches aim at reducing the structural bias of technology mapping, which refers to the dependence of the mapped network on the initial structure. Functionally Reduced AIGs (FRAIGs) use a combination of simulation and combinational equivalence checking (SAT) to find equivalent (up to complement) AND nodes. These AND nodes are merged into choice nodes. Intuitively, a choice node can be seen as a vertex that encodes different implementations of a function (up to complementation).

Alternatively, a lossless synthesis flow generates choices nodes by storing nodes generated in intermediate steps of the synthesis process. In contrast, certain technology mappers only sees the nodes in the network resulting from the optimization process. In another approach, a framework to combine logic transformations with technology mapping is used. At each step the technology mapper evaluates the impact of a logic transformation on the mapped circuit.

LUT Optimization Techniques

LUT optimization techniques (e.g., step 160 in FIG. 1, instruction 6 in Code Listing 1) include Boolean methods. Boolean methods are based on Boolean transformations that consider the nature of logic functions and improve logic networks through the freedom provided by don't care conditions. Consider permissible functions as one example of don't care interpretation in synthesis: if the function at node n can be changed into another function without changing the behavior of the primary outputs, the new function is called a permissible function. The set of all permissible functions for a node n is called its Maximum Set of Permissible Functions (MSPF), and can be used to enhance Boolean transformations such as resubstitution, refactoring, rewriting, etc. Due to the use of don't cares and Boolean identities, Boolean methods achieve better optimization. Different reasoning engines can be used for detecting permissible functions and don't care conditions, and the right choice of such engine can improve the scalability of the Boolean methods. Examples of such engines include truth tables, BDDs (Binary Decision Diagrams), and SAT (SATisfiability).

Figure 3:
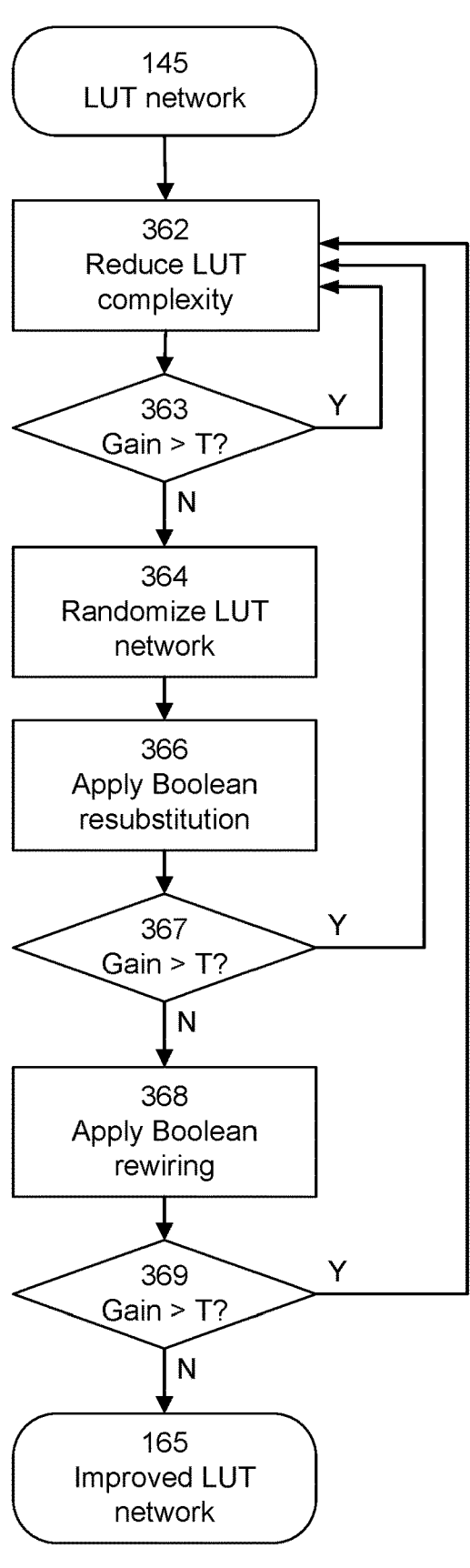
FIG. 3 is a flow diagram of improving a network of LUTs according to embodiments of the present disclosure.

FIG. 3 is a flow diagram for improving a network of LUTs. This process uses a number of different techniques for improving LUTs, which are applied in order of increasing runtime. The techniques are combined in an intelligent gradient-based engine. Code Listing 3 depicts the pseudocode for FIG. 3. Note that some parameters related to mapping and to optimization methods are omitted for the sake of brevity.

---

Code Listing 3: LUT improvement

---

```
Input: AIG N, LUT size k, effort E, small gain thr. T
Output: Optimized AIG N.
  1:    N dup = N; /* for lossless synthesis */
  2:    lut_map(N, k); gain =0;
  3:    while E > 0 d
  4:        update (gain);
  5:        if gain is flat for too many interations then
  6:            break;
  7:        end if
  8:        if gain > T then
  9:            /* if gain > T, apply cheap optimization*/
 10:            lut_reduction(N); simplify_dc(N);
 11:            lut_map(N; k); reduce_budget(E);
 12:            continue;
 13:        end if
 14:        det_randomize(N);
 15:        /* apply stronger optimization 1 */
 16:        lut_resub(N); lut_reduction(N);
 17:        simplify_dc(N); lut_map(N, k);
 18:        reduce_budget (E); update (gain);
 19:        if gain > T then
 20:            continue;
 21:        end if
 22:        /* apply stronger optimization 2 */
 23:        lut_resub(N); Boolean_rewiring(N);
 24:        simplify_dc(N); lut_map(N, k);
 25:        reduce_budget(E); update (gain);
 26:    end while
 27:    Boolean_decomp(N);
 28:    if N is better than N dup then
 29:        return N:
 30:    end if
 31:    return N dup
```

---

This approach makes LUT improvement adaptive. This is achieved by using gradient computation of the NAND2/AIG count gain. It allows the system to decide dynamically the best next attempted transformation. The algorithm starts by duplicating the current network. This is done in case the algorithm degrades the NAND2/AIG cost and decides to revert at the end. The iterative loops are controlled by a budget E, which is consumed by running various LUT optimization techniques.

The LUT optimization techniques are applied in a waterfall model where different techniques are applied sequentially according to an order. This leads to better runtime as compared to a parallel model. In this example, the waterfall model is a good tradeoff between runtime and QoR. This example uses three main LUT optimization techniques 362, 366, 368 in the waterfall model. The first technique 362 is the cheapest in terms of runtime and includes LUT support reduction, Sum of Products simplification with don't cares and remapping.

Support reduction removes redundant inputs that LUTs might have. For example, it is desirable to reduce a 3-LUT into a 2-LUT, if possible. The support of LUTs may be reduced by computing the functional support using either BDD or SAT based methods, for example. When the functional support size is smaller than the LUT size of the node, the old sum of products (SOP) with redundant inputs may be replaced with a new ISOP computed based on the functional support.

Sum Of Products (SOP) is a standard Boolean representation, which expresses a logic function as a sum of products. SOP simplification employs 2-level minimization algorithms applied to the SOP representation. In the context of LUTs, SOP simplification can be made powerful because there is a tight bound on the support size by construction, so higher effort minimizations can be run without incurring an intractable runtime.

This least runtime expensive approach 362 is repeated until the gain no longer exceeds some threshold T 363. This reduces the complexity of the LUTs in the network with low effort, so this approach continues until diminishing returns are reached. If the gain is less than the threshold T 363, additional LUT techniques are considered.

Before getting into the stronger techniques, deterministic randomization 364 of the LUT network is applied. This includes shuffling fan-in/fan-out order of the nodes and picking different topological orderings. Randomizing the network may escape local minima.

In this example, the first higher effort LUT optimization technique includes Boolean resubstitution 366, in addition to LUT reduction, simplify with don't cares and LUT remapping. Resubstituting and saving one large LUT, or replacing a k-LUT with a (k−j)-LUT, reduces the complexity of the network more significantly than just resubstituting one AIG node. One approach starts by sorting the LUTs by their potential gains. The potential gain may be the number of literals in the factored form that this LUT would save if removed. The algorithm then iterates over the LUTs, computing their flexibilities and trying to re-express the LUT functionality by leveraging other LUTs already presented in the network. The LUTs are processed to find which other nodes are connectable, up to complementation, to realize the function of the target LUT via an OR operator. The set of candidate nodes to re-express the original LUT functionality can be computed with BDDs, SAT, or truth tables. The loop continues to iterate so long as the gain exceeds a threshold T 367.

The next higher effort LUT optimization technique includes Boolean rewiring 368, in addition to the prior techniques. Boolean rewiring is a powerful transform to escape local minima as it can add/remove wires, reduce literal cost and highlight new LUT compaction opportunities. Boolean rewiring is a synthesis technique that includes a sequence of additions and removals of redundant wires, with the goal of reducing the (factored) literal cost of the network. Inserting a new redundant wire to an irredundant circuit can make two or more wires to be redundant, under certain conditions, thus leading to new simplification opportunities. Inserting a new redundant wire means introducing a new gate, or swapping to a wider gate, capable of receiving the extra connection. The loop continues to iterate so long as the gain exceeds a threshold T 369.

If the gain remains flat for too long during the loop, the LUT engine may automatically end to save runtime. The result of the process shown in FIG. 3 is an improved network 165 of LUTs.

Decomposition of LUTs to AIG

Approaches to LUT decomposition (e.g., step 170 in FIG. 1, instruction 7 in Code Listing 1) may be based on Boolean factorization. Boolean factorization enables iterative efficient AIG decomposition while reducing the ASIC implementation cost.

The division function is an important component of many techniques, such as resubstitution and factorization extraction. In general terms, given functions $f$ and p, the division of $f$ by p gives a quotient q and a remainder r. Thus, $f=p·q+r$,

11 where the operator · denotes the AND Boolean function, and the operator + denotes the OR Boolean function. If the remainder is not null, then p is a Boolean divisor of $f$, otherwise, p is said to be a Boolean factor of $f$. Note that, in the general case, q and r are not unique, and a function might have several Boolean divisors and factors. A restricted version of division is the algebraic division, where the quotient is unique. It restricts the function to be minimal concerning single cube containment, i.e., there is not a single cube that contains another cube in the expression. Let the support of a function be the variables in which the function depends on. An algebraic product p·q is such that the support of p and q are disjoint, i.e., p and q have no variables in common. These concepts are used below to explain the Boolean division, and how it fits into a Boolean decomposition algorithm. Weak and algebraic division are used interchangeably.

Boolean decomposition can be done in different ways. For instance, one can collapse the function outputs and run Boolean decomposition for the set of outputs. However, that has a high complexity, and collapsing is not always practical. Another possibility is to run Boolean decomposition to reduce the support of LUTs. Other methods rely on disjoint support decomposition, but are less general. Therefore, this example uses a specialized Boolean decomposition that aims to reduce the factored literal cost. That has a better co-relation with the goal to reduce the post decomposition NAND-2 equivalent implementation cost instead of the LUT count.

Figure 4:
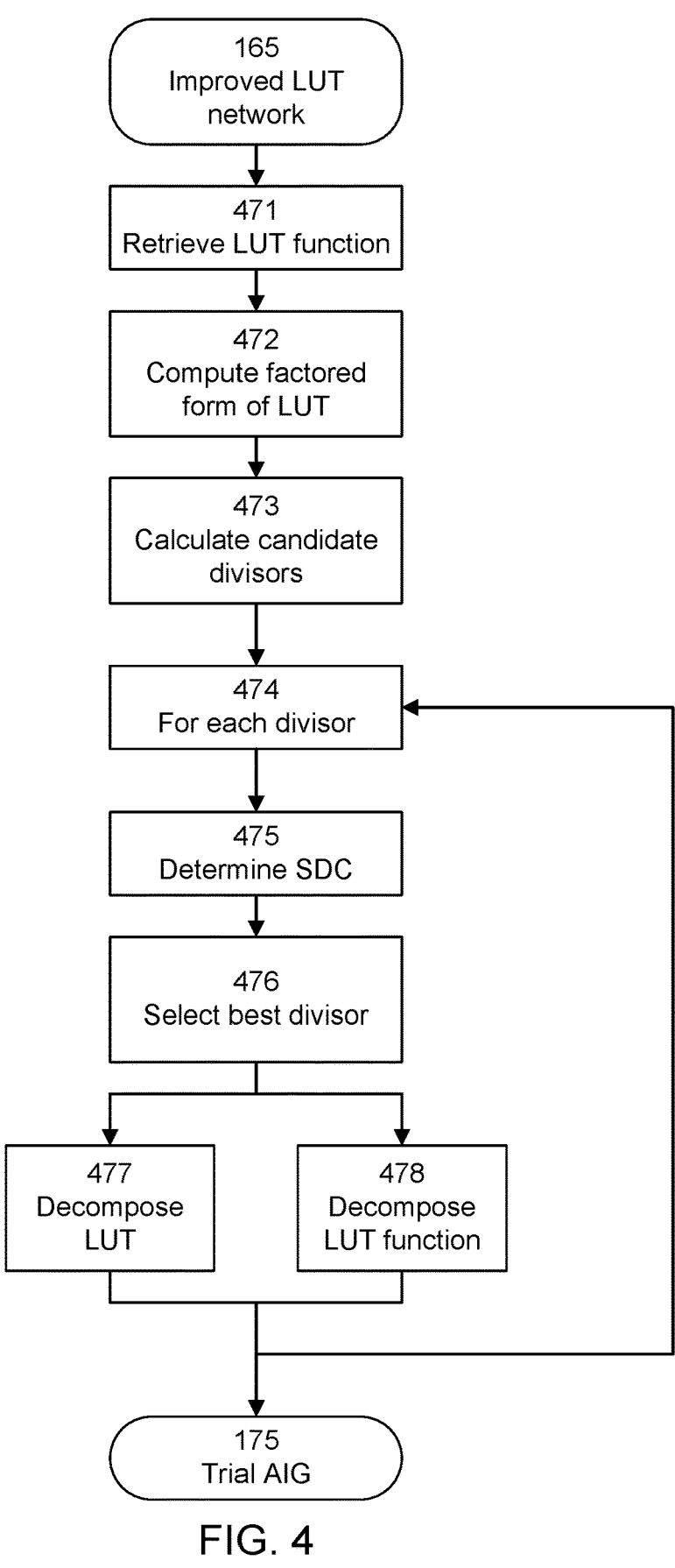
FIG. 4 is a flow diagram of decomposition of LUTs into an AIG according to embodiments of the present disclosure.

FIG. 4 is a flow diagram for decomposition of LUTs into an AIG according to embodiments of the present disclosure. Code listing 4 provides pseudo-code corresponding to FIG. 4. The flow shown makes use of Boolean division. Boolean division is more powerful than algebraic division, and can be achieved by modifying the weak division. A new variable can be added to replace p (the divisor), call it x, and the expression p⊕x can be introduced as a don't care condition for $f$. The ⊕ refers to the Exclusive Or Boolean operator. The function $f$ is then minimized with a two-level logic minimizer that considers the Satisfiability Don't Care (SDC) condition introduced. Finally, the weak division is run in the resulting optimized function. This Boolean decomposition flow leverages Boolean division.

---

Code Listing 4: Boolean decomposition

```
    Input: LUT-Mapped network 𝒩
    Output: Decomposed AIG 𝒩′
1   for each LUT L in topological order do
2       f ← lut_function(L);
3       current_cost ← factored_form(f);
4       D ← compute_recursively_divisors(f);
5       best_divisor ← Ø;
6       for each d ∈ D do
7           DC ← DC(f) + (x ⊕ d);
8           f′ < two_lvl_minimizer(f, DC);
9           new_cost ← factored_form(f′);
10          if current_cost > new_cost then
11              current_cost ← new_cost;
12              best_divisor ← d;
13      if d ! = Ø then
14          build_aig(𝒩′, d);
15          continue;
16      build_aig(𝒩′, f):
17  return 𝒩′
```

---

The following flow is performed for each LUT. At 471 (instruction 2), the function of the LUT is retrieved. This function may be determined in the flow of FIG. 2. Alternatively, the truth table for the LUT may be computed. Truth table computation can be handled efficiently for LUTs with a limited number of inputs. At 472 (instruction 3), the factored form of the LUT is used as a proxy of the LUT complexity.

At 473 (instruction 4), candidate divisors are calculated based on kernels to decompose the LUT. Kernel intersection is performed to find candidate divisors that improve sharing among LUTs. Since there is a tight boundary in the fanin number for LUTs, kerneling computation and intersection can be run with acceptable runtime. In some implementations, the level of kernels and the number of divisors to try may be configurable.

Loop 474 (instructions 6-12) is performed for each potential divisor d. Within the loop 474, Boolean division takes place. At 475 (instruction 7), a new variable x is introduced in the function, and the exclusive OR of this variable with the divisor is projected as the Satisfiability Don't Care in the don't care conditions of the function. The gain of the division is given by how many literals can be saved compared to f. The best divisor is the one that has the highest reduction in the literal count.

At 476 (instructions 10-12), the best divisor is selected. At 477 (instructions 13-15), the system decomposes each LUT to build a new AIG. Alternatively, at 478 (instruction 16), if the division does not happen, the system can decompose the function $f$ itself. Structural hashing takes place to increase logic sharing whenever possible while decomposing a new LUT and adding nodes to the AIG.

Experimental Results

This section presents experimental results for an example of the LUT-engine. The LUT-engine is first employed to improve the best results in the EPFL synthesis competition. Then, the LUT-engine is integrated in a commercial EDA flow. These experiments show strong improvements in QoR, post place & route, and better runtime and scalability, as compared to alternative approaches.

The LUT-engine II was integrated in a commercial design flow. This LUT-engine runs during Boolean optimization, part of logic synthesis, driven by area minimization goal. On top of costing for area improvements, the number of levels and number of nets is also controlled. These metrics are known to correlate with delay and congestion in the physical synthesis portion of the design flow. To compete on the EPFL benchmarks, the LUT-engine was compiled as a standalone package capable of writing LUT-netlists directly.

The following are the results for the EPFL benchmarks. In particular, the LUT-engine challenges the area (i.e., number of LUTs) category within the EPFL benchmark suite project that keeps track of the best 6-input LUT synthesis results. The LUT-engine was configured with k up to 10, random S strategy, and runtime budget of max 60 mins, with early bailout when no gain/change in the network is observed for 5 consecutive loops. As a final step, the LUT-engine also used k=6 mapping with no ASIC considerations, so as to target minimum numbers of 6-LUTs, as specified by the EPFL competition. Most benchmarks run in minutes, with exception of the larger ones, such as div and hypotenuse.

The LUT-engine improved the previous best size (area) results for 9 benchmarks reported in Table 1. The improvements range from a few hundred 6-LUTs to a few tens of 6-LUTs and just a few 6-LUTs for the smaller benchmarks. Interestingly, i2c and mem_ctrl reach for the first time <200 and <2000 6-LUTs, respectively. Improvements on these two benchmarks are known to have good correlation with industrial designs.

TABLE 1

| New Best Area Circuits For The EPFL Synthesis Competition | | | |
|---|---|---|---|
| Benchmark | I/O | 6-LUT count | Level Count. |
| Sin | 24/25 | 1198 | 60 |
| Hypotenuse | 256/128 | 39593 | 4438 |
| i2c | 147/142 | 198 | 12 |
| cavlc | 10/11 | 67 | 3 |
| arbiter | 256/129 | 305 | 78 |
| sqrt | 128/64 | 3026 | 1087 |
| voter | 1001/1 | 1280 | 19 |
| divisor | 128/128 | 3238 | 1185 |
| mem_ctrl | 1204/1231 | 1986 | 22 |

In addition to the EPFL benchmarks, the LUT-engine was also run on 87 ASIC benchmarks. There were 22 open cores designs and 65 industrial designs. The LUT-engine results are compared with a baseline flow, which is state-of-the-art commercial EDA flow but not running any LUT-engine. The results for open cores designs, post place and route, are summarized in Table 2. The LUT-engine achieves stronger area reduction with faster execution.

TABLE 2

| Post Place & Route Results on 22 Open Cores Design | | | | | |
|---|---|---|---|---|---|
| Flow | Area | Power | WNS | TNS | Runtime |
| Baseline | 1 | 1 | 1 | 1 | 1 |
| LUT-engine | −3.23% | −3.73% | −3.41% | −7.15% | +4% |

The results for industrial designs, post place & route, are summarized in Table 3. Also here, the LUT-engine achieved substantial smaller area implementations in less runtime. All implementations are verified with an industrial formal equivalence checking flow.

TABLE 3

| Post Place & Route Results on 65 Industrial Design | | | | | |
|---|---|---|---|---|---|
| Flow | Area | Power | WNS | TNS | Runtime |
| Baseline | 1 | 1 | 1 | 1 | 1 |
| LUT-engine | −5.06% | −5.41% | −3.09% | −3.16% | +5% |

EDA Flow

Figure 5:
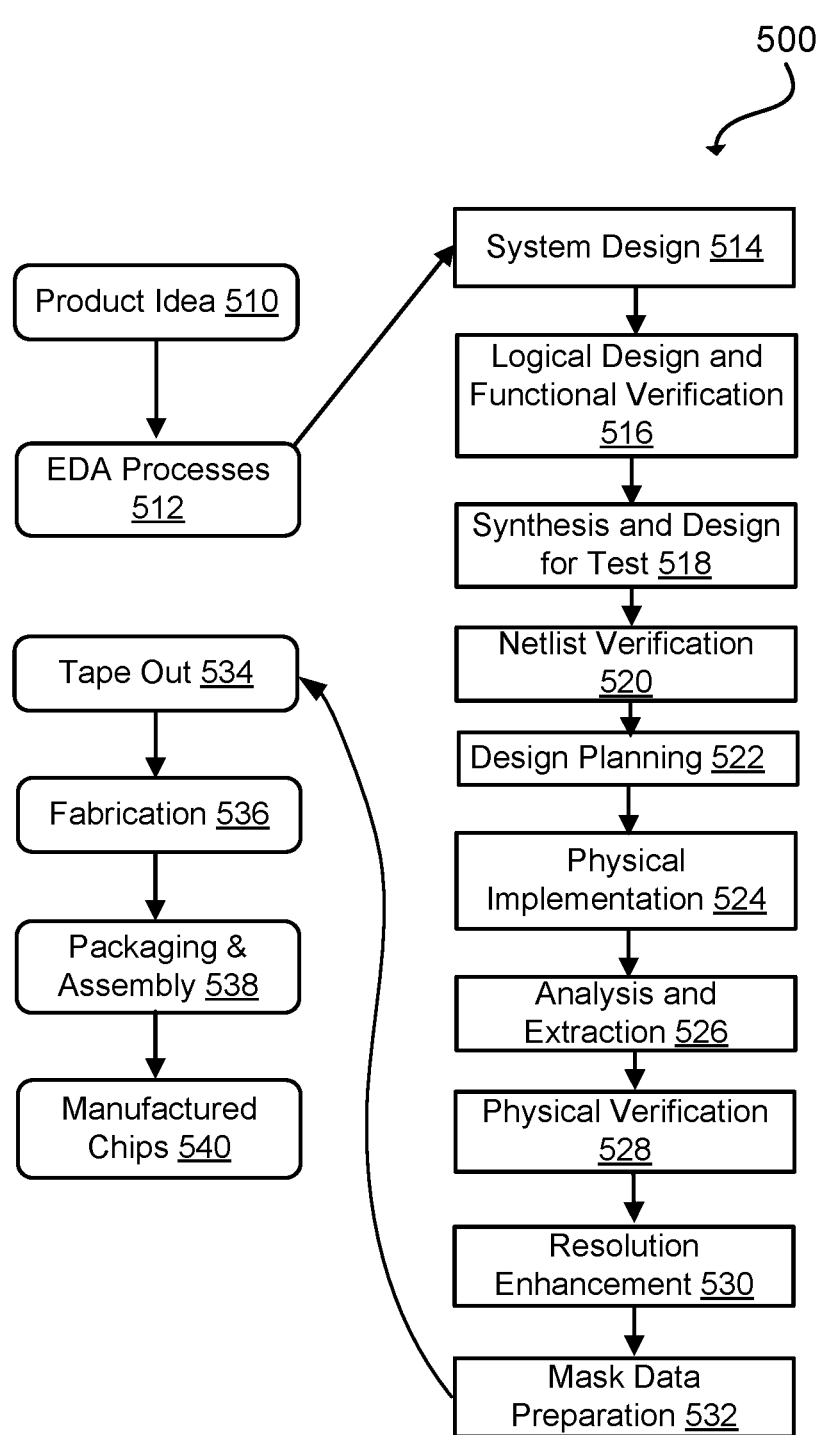
FIG. 5 depicts a flowchart of various processes used during the design and manufacture of an integrated circuit in accordance with embodiments of the present disclosure.

FIG. 5 illustrates an example set of processes 500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 510 with information supplied by a designer, information which is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of abstraction may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 5. The processes described by be enabled by EDA products (or tools).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system (such as computer system 600 of FIG. 6) may be used to store the programs and data structures that are used by some or all of the EDA products described herein, and products used for development of cells for the library and for physical and logical design that use the library.

Figure 6:
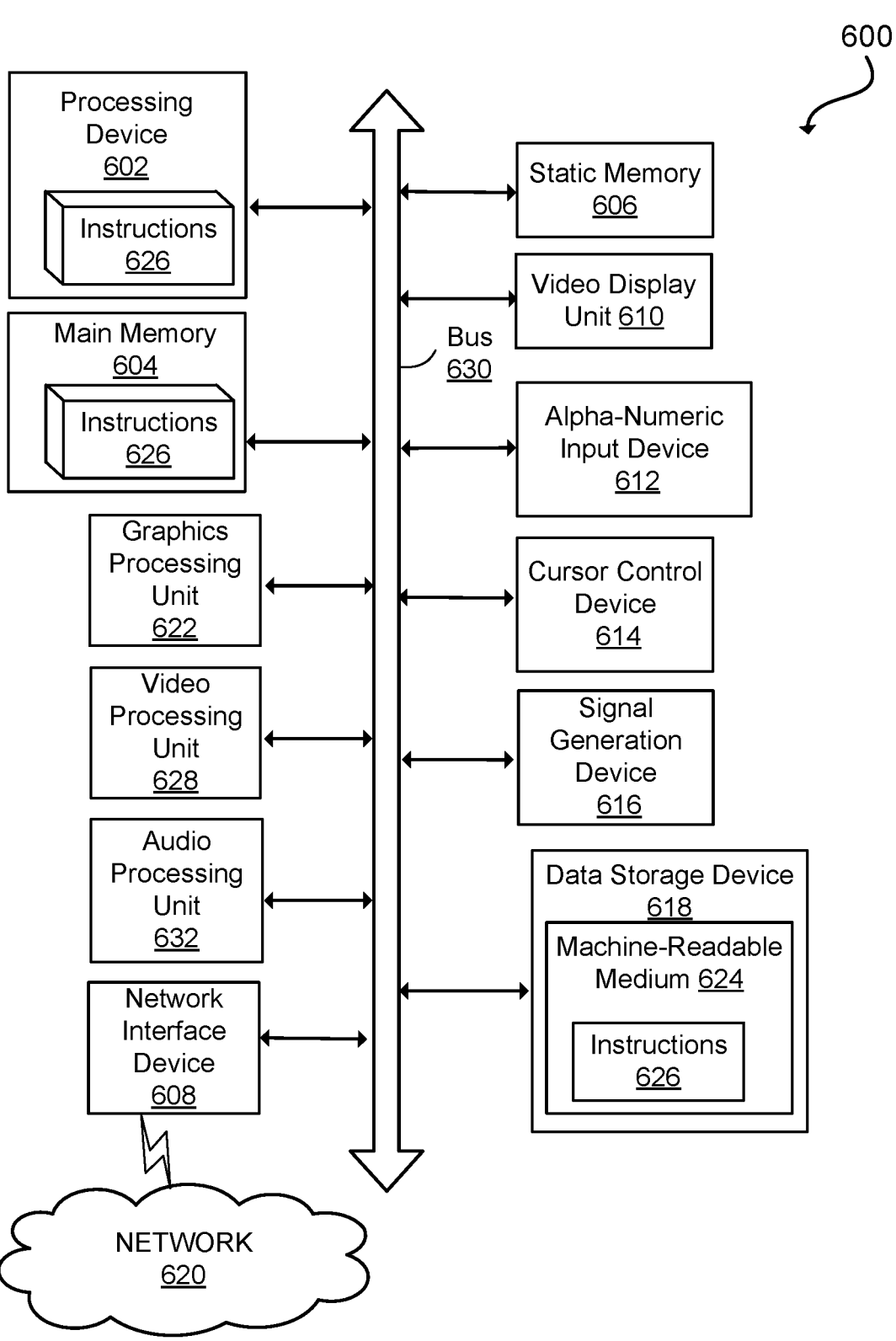
FIG. 6 depicts a diagram of an example computer system in which embodiments of the present disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
accessing a description of a design of an application-specific integrated circuit (ASIC), the description comprising a logic network that implements a functionality of the ASIC; and
performing, by a processing device, two or more iterations, each iteration comprising:
selecting a lookup table (LUT) size k;
mapping a current And-Inverter graph (AIG) representation of the logic network into a network of k-LUTs, wherein a k-LUT is a lookup table that can represent a function of k variables;
improving a functionality of the network of k-LUTs;
decomposing the improved network of k-LUTs into a trial AIG representation;
improving a structure of the trial AIG representation;
evaluating a quality of the improved trial AIG representation; and updating the current AIG representation in accordance with the quality of the trial AIG representation; and
synthesizing a final AIG representation from the iterations to a gate-level netlist of standard cells.

2. The method of claim 1 wherein mapping the current AIG representation of the logic network into the network of k-LUTs is based at least in part on estimated areas of the k-LUTs.

3. The method of claim 1 wherein the selected LUT size k is different for each iteration.

4. The method of claim 1 wherein mapping the current AIG representation of the logic network into the network of k-LUTs comprises:
computing a choice network from the AIG representation; and
mapping the choice network to the network of k-LUTs.

5. The method of claim 4 wherein computing the choice network uses a SAT-based approach.

6. The method of claim 1 wherein mapping the current AIG representation of the logic network into the network of k-LUTs uses a cut-based structural mapper.

7. The method of claim 1 wherein decomposing the improved network of k-LUTs into a trial AIG representation is based on Boolean division.

8. A system comprising:
a memory storing instructions; and
a processor device, coupled with the memory and to execute the instructions, the instructions when executed cause the processor device to:
access a description of a design of a circuit, the description comprising a logic network that implements a functionality of the circuit; and
perform two or more iterations, each iteration comprising:
selecting a lookup table (LUT) size k;
mapping a current directed acyclic graph (DAG) representation of the logic network into a network of k-LUTs, wherein a k-LUT is a lookup table that can represent a function of k variables;
decomposing the network of k-LUTs into a trial DAG representation; and
updating the current DAG representation in accordance with a quality of the trial DAG representation; and
synthesizing a final DAG representation from the iterations to a netlist of standard cells.

9. The system of claim 8 wherein mapping the current DAG representation of the logic network into the network of k-LUTs is based at least in part on estimated areas of the k-LUTs.

10. The system of claim 8 wherein mapping the current DAG representation of the logic network into the network of k-LUTs produces a network of minimum depth.

11. The system of claim 8 wherein mapping the current DAG representation of the logic network into the network of k-LUTs comprises at least one of: applying a tree mapper; collapsing the logic network into nodes with more than k variables; finding a cover for the logic network from a set of possible partitions into k-LUTs; using priority cuts of the logic network; using functionally reduced AIGs; and a lossless synthesis flow.

12. The system of claim 8 wherein each iteration further comprises: improving the functionality of the network of k-LUTs, wherein decomposing the network of k-LUTs comprises decomposing the improved network of k-LUTs.

13. The system of claim 12 wherein improving the functionality of the network of k-LUTs comprises at least one of Sum of Products minimization, support reduction, Boolean resubstitution and Boolean rewiring.

14. The system of claim 8 wherein updating the current DAG representation comprises: replacing the current DAG representation with the trial DAG representation, if the quality of the trial DAG representation is better than a quality of the current DAG representation.

15. A non-transitory computer readable medium comprising stored instructions, which when executed by a processor device, cause the processor device to:

access a description of an application-specific integrated circuit (ASIC), the description comprising a logic network that implements a functionality of the ASIC; and perform two or more iterations, each iteration comprising:

selecting a lookup table (LUT) size k;

mapping a current representation of the logic network into a network of k-LUTs, wherein a k-LUT is a lookup table that can represent any function of k variables;

decomposing the improved network of k-LUTs into a trial representation, including improving the network of k-LUTs and/or improving the trial representation; and updating the current representation in accordance with a quality of the trial representation; and synthesizing a final representation from the iterations to a netlist of standard cells.

16. The non-transitory computer readable medium of claim 15 wherein mapping the current representation of the logic network into the network of k-LUTs is based at least in part on estimated areas of the k-LUTs.

17. The non-transitory computer readable medium of claim 15 wherein the selected LUT size k is different for each iteration.

18. The non-transitory computer readable medium of claim 15 wherein the selected LUT size k increases for each iteration.

19. The non-transitory computer readable medium of claim 15 wherein the LUT size k is selected from a pre-defined list of LUT sizes.

20. The non-transitory computer readable medium of claim 15 wherein the LUT size k is selected using deterministic randomization.

* * * * *